United States Patent
Testa

(10) Patent No.: US 10,006,745 B2
(45) Date of Patent: Jun. 26, 2018

(54) DETECTION SYSTEM

(71) Applicant: Vision Engineering Solutions, LLC, Orlando, FL (US)

(72) Inventor: Stephen R. Testa, Merritt Island, FL (US)

(73) Assignee: Vision Engineering Solutions, LLC, Merritt Island, FL (US)

( * ) Notice: Subject to any disclaimer, the term of this patent is extended or adjusted under 35 U.S.C. 154(b) by 397 days.

(21) Appl. No.: 14/565,411

(22) Filed: Dec. 9, 2014

(65) Prior Publication Data

US 2016/0229550 A1    Aug. 11, 2016

Related U.S. Application Data

(60) Provisional application No. 61/914,262, filed on Dec. 10, 2013.

(51) Int. Cl.
  *G08B 21/00* (2006.01)
  *F41H 11/00* (2006.01)
  *G01S 3/782* (2006.01)

(52) U.S. Cl.
  CPC ............. *F41H 11/00* (2013.01); *G01S 3/782* (2013.01)

(58) Field of Classification Search
  None
  See application file for complete search history.

(56) References Cited

U.S. PATENT DOCUMENTS

| | | | | |
|---|---|---|---|---|
| 5,771,092 | A * | 6/1998 | Dubois | G01S 7/4804 356/138 |
| 7,035,308 | B1 * | 4/2006 | McNeil | F41H 3/00 342/1 |
| 9,415,745 | B1 * | 8/2016 | Clemen, Jr. | B60R 22/00 |
| 2008/0002192 | A1 * | 1/2008 | David | G01S 3/783 356/141.5 |
| 2009/0260511 | A1 * | 10/2009 | Melnychuk | F41G 3/147 89/1.11 |
| 2010/0253567 | A1 * | 10/2010 | Factor | G01S 7/36 342/52 |
| 2011/0006222 | A1 * | 1/2011 | Aragones | G01S 7/495 250/492.1 |
| 2014/0192367 | A1 * | 7/2014 | Jungwirth | G01S 7/495 356/614 |
| 2015/0219426 | A1 * | 8/2015 | Moraites | G01J 5/0022 89/1.11 |

* cited by examiner

*Primary Examiner* — Brian Zimmerman
*Assistant Examiner* — Kevin Lau
(74) *Attorney, Agent, or Firm* — Barnes & Thornburg LLP

(57) ABSTRACT

A threat detection system is disclosed. The threat detection system may also determine the location of the threat. The treat detection system may determine the threat attributes. The threat detection system may detect lasers.

11 Claims, 2 Drawing Sheets

DETECTION SYSTEM

This application claims priority to and the benefit of U.S. Provisional Patent Application No. 61/914,262, filed Dec. 10, 2013, the disclosure of which is now incorporated herein by reference.

FIELD OF THE DISCLOSURE

The present disclosure relates generally to threat detection systems, and more specifically to a laser detection, avoidance and attribution system.

BACKGROUND

Threat systems may target or be directed at personnel, structures and vehicles, such as for example and without limitation an aircraft. One illustrative threat is a laser. A 2013 FAA report disclosed nearly 3,500 incidents of laser illumination of U.S. aircraft in 2012, up nearly thirteen fold from 384 incidents in 2006. The ready availability of relatively inexpensive, hand-held, commercial and military lasers has contributed to the increasing trend of laser incidents. Laser illumination may expose aircrew and/or passengers to harmful effects during flight operations, including departure and arrival maneuvers. Illustrative harmful effects include disorientation, flash blindness, and eye injury. Equipment, including optical sensors and cameras, may also be damaged by laser illumination.

Threats are posed to tactical systems such as, without limitation, Unmanned Aerial Systems (UASs). In particular Intelligence Surveillance and Reconnaissance (ISR) systems on or integrated with UASs may be vulnerable to jamming or damage by a laser system.

With recent developments in High Energy Laser Systems (HELs), rapid detection, attribution and geo-location of these threat systems becomes a priority if evasive or protective actions are to be employed.

A threat detection system is desired.

SUMMARY

The present disclosure may comprise one or more of the following features and combinations thereof and the claims appended hereto.

An illustrative detection system may include a sensor system, a control unit, and a display.

Illustratively, the detection system comprises low profile components.

In some embodiments, the sensor system illustratively comprises a photonic detector.

In some embodiments, the sensor system illustratively comprises a plurality of photonic detectors.

Illustratively, the photonic detectors comprise micro-sized detectors.

In still further embodiments, the photonic detector(s) illustratively may comprise detectors selected to detect wavelengths of interest.

Illustratively, the detector(s) may be selectively tuned to wavelength(s) of interest.

Further illustratively, the sensor system may be optimized to detect laser wavelengths of interest.

Further illustratively, the sensor system may exploit the polarization state of the laser.

Further illustratively, the sensor system may exploit the coherent nature of laser light.

Illustratively, the detection system may be operatively integrated into a vehicle in order to provide continuous surveillance and detection around the vehicle.

Illustratively, the vehicle may be an aircraft and the detection system provides continuous surveillance and detection capabilities in three dimensions about the aircraft.

Illustratively, the detection system comprises components that have a minimal impact upon vehicle aerodynamic geometry.

In some embodiments, the control unit may comprise detection circuitry.

Illustratively, the detection circuitry may comprise high-speed circuitry.

Illustratively, the control unit may comprise a signal processor.

Illustratively, the control unit may comprise a central processing unit.

Illustratively, the control unit may comprise a stream processor such as for example and without limitation a Graphical Processing Unit.

Illustratively, the control unit may comprise a Field Programmable Gate Array (FPGA).

Illustratively, the control unit may comprise a signal conditioner.

Illustratively, the control unit is light weight.

Illustratively, the control unit is low power.

Illustratively, the control unit is integrated into the vehicle.

Illustratively, the control unit processes a detection signal from the detection system and calculates an attribution of the detected threat.

Illustratively, the detection system calculates the geographic location of the source of the threat, for example a laser.

Illustratively, the control unit generates a warning.

Illustratively, the warning comprises a cue perceptible to or by any one or any combination of human senses.

Illustratively, the warning comprises an aural or auditory cue.

Illustratively, the warning comprises a visual cue.

Illustratively, the warning comprises a tactile cue.

Illustratively, the warning comprises an olfactory cue.

Illustratively, the warning comprises any of the foregoing cues alone or in combination.

Illustratively, the cue or combination of cues is selectable.

Illustratively, the warning provides a geographic location.

Illustratively, the geographic location is presented on the display.

Illustratively, the display provides the geographic location in a graphical user interface.

Illustratively, the graphical user interface depicts the geographic location(s) in three dimensions.

Illustratively, the control unit provides the geographic location(s) in a map coordinate system.

Illustratively the coordinate system is chosen from the list of coordinate systems including UTM (Universal Transverse Mercator), Lat-Long (Geodetic grid) and grid reference.

Illustratively, a 3D coordinate system may be used. This coordinate system may be geodetic or inertial.

Illustratively, the detection system may download the geographic location of the detected threat to an off-board device.

Illustratively, the detection system further comprises a countermeasure system.

Illustratively, the countermeasure system comprises a defensive system to protect the vehicle and/or personnel and/or equipment on board the vehicle.

Illustratively, the countermeasure system comprises a weapon system.

Illustratively, the components of the detection system are integrated with one another.

Illustratively, the display may comprise a stand-alone display.

Illustratively, the display may comprise a multi-function display.

Illustratively, the display may comprise a heads-up display.

Illustratively, the display may comprise a stick-shaker.

Illustratively, the detection system provides near instantaneous alert cues.

Illustratively, the display is night vision compatible.

According to another aspect of the present disclosure, a method of detecting a threat may include providing a sensor system, providing control unit and providing a display.

Illustratively, the method includes sensing a threat.

Illustratively, the method comprises generating a threat signal.

Illustratively, the method comprises processing the threat signal.

Illustratively, the method comprises disseminating the threat signal as a warning cue.

Illustratively, the method comprises displaying the warning cue as any one of or any combination of an aural, visual, tactile, olfactory cue.

Illustratively, the method comprises providing the geographic location of the threat.

Illustratively, the method comprises actuating a self-protection system.

Illustratively, the self-protection system comprises protective shielding.

Illustratively, the self-protection system comprises protective vehicle glass.

Illustratively, the self-protection system comprises a protective visor.

Illustratively, the self-protection system comprises flares.

Illustratively, the self-protection system comprises a weapon.

In some embodiments, the sensor system, the control unit and the display are integrated with one another.

Illustratively, the detection system further integrates the self-protection system.

Illustratively, the detection system and a vehicle are integrated together.

Illustratively, the detection system is selectively tunable.

Illustratively, the mode of warning cue is selectable.

In one embodiment, a detection system operating according to the method of any of the preceding claims is provided.

Also provided is an illustrative method of using the illustrative detection system according to any of the illustrative embodiments disclosed herein.

In another illustrative aspect of the present disclosure, an illustrative vehicle comprising a detection system of any of the illustrative embodiments disclosed herein is provided.

These and other features of the present disclosure will become more apparent from the following description of the illustrative embodiments.

DETAILED DESCRIPTION OF THE DRAWINGS

Figure 1:
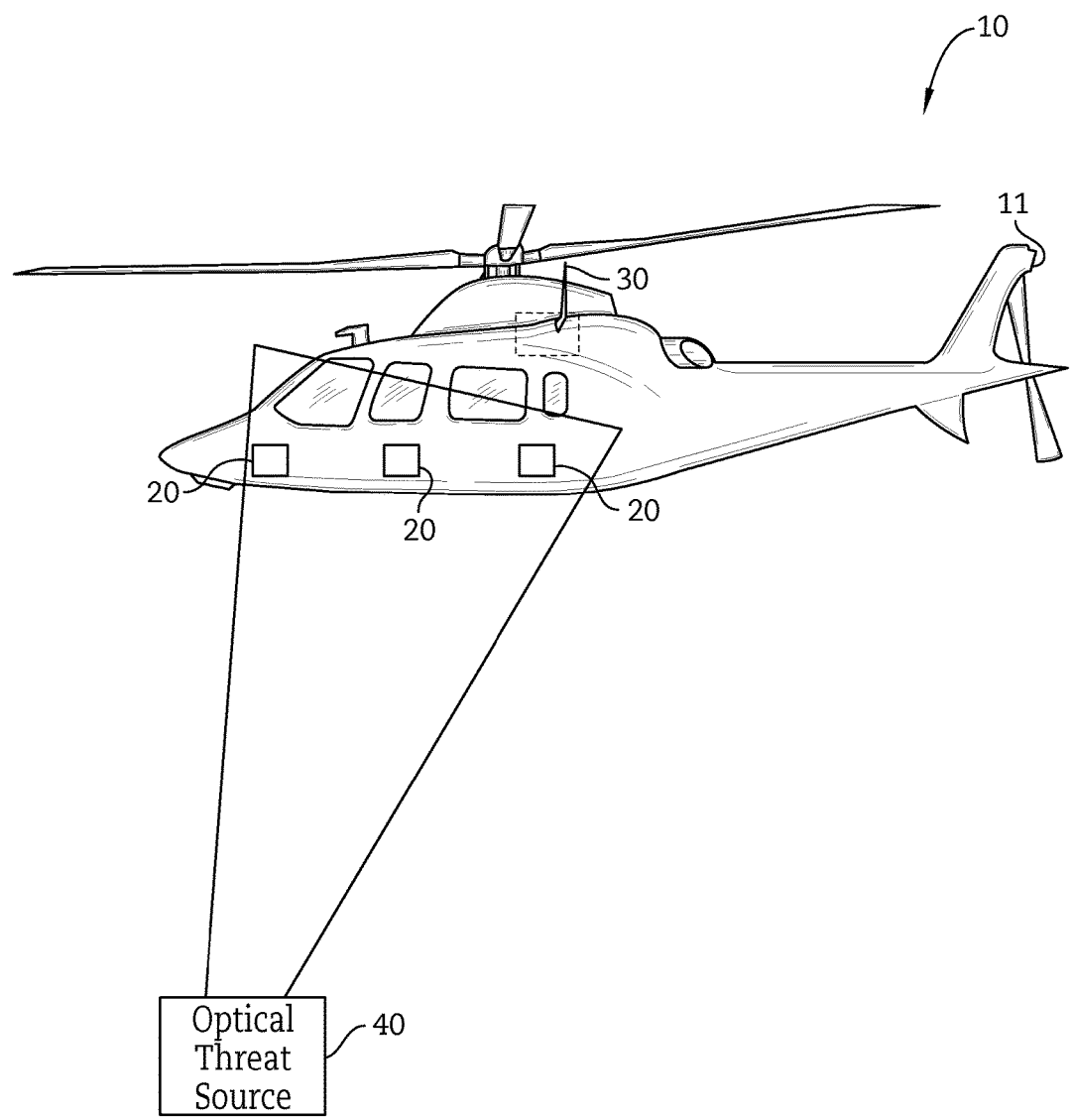
FIG. 1 is a diagrammatic depiction of an illustrative detection system.

For the purposes of promoting an understanding of the principles of the disclosure, reference will now be made to a number of illustrative embodiments illustrated in the drawings and specific language will be used to describe the same.

Referring to the Figures, an illustrative detection system 10 is depicted as further described by in the Summary and the claims appended hereto. As seen in FIG. 1, the sensors 20 are illustratively integrated together with the vehicle 11. The sensors illustratively are spaced apart from one another. The sensors illustratively provide all aspect and continuous coverage allowing the system 10 to monitor threats 40 all around the vehicle. The sensors illustratively are integrated with and in communication with the control unit and the signal processor 30.

Figure 2:
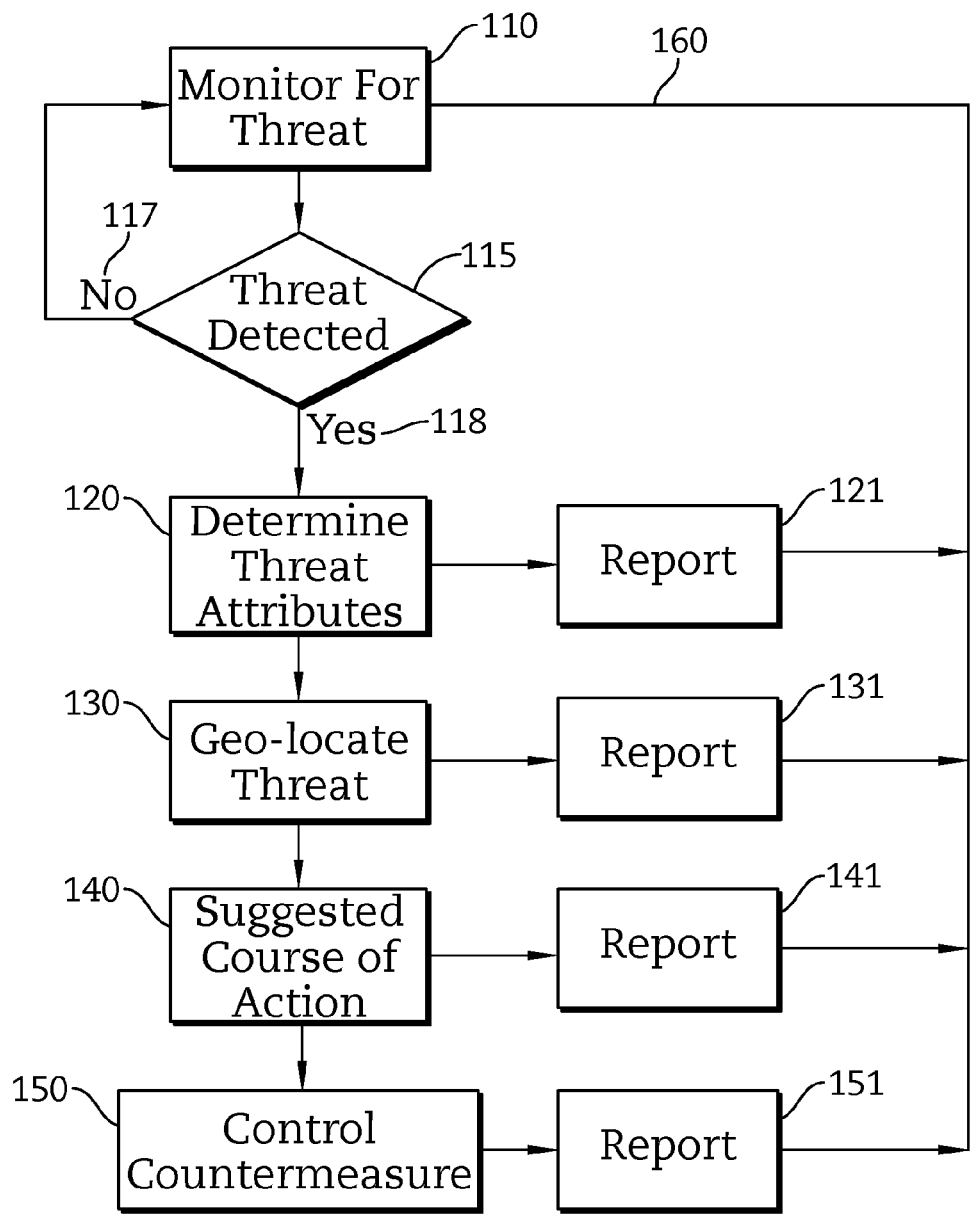
FIG. 2 is a flow chart depicting an illustrative method of detecting a threat.

Referring to FIG. 2, the system 10 monitors and determines whether a threat is detected 115. If a threat is not detected 117, then the system will continue to monitor for threat(s). If a threat is detected 118, then the system will determine the threat attributes 120, for example, whether it is a threat laser, and generate a report 121 such as a threat report 121. The system illustratively will also geo-locate 130 the threat and generate a location report 131. The system 10 illustratively will suggest a course of action 140. For example, the system may suggest how to neutralize or avoid the threat and may generate a report 141. The system may also actuate or otherwise control 150 any available countermeasures, including for example and without limitation passive protective devices and/or kinetic protective devices and may generate a report 151. Reports and continuous monitoring for threats illustratively will continue 160 throughout all steps.

Illustrative countermeasures may include chaff, flares, protective shields, optical filters, physical maneuvers, a weapon that targets the source of the threat, and the like. The protective shield may be opaque or translucent. For example, it may comprise a completely opaque piece of metal, plastic, wood, or composite material. The glass of the cockpit, or the pilot's visor, or an optical device's lens may change as required. For example, the glass may transition from completely clear or transparent to translucent to opaque, moving from clear, to smokey, to opaque. The glass may change its composition or it may be overlaid by a filter to deflect or alter certain wavelengths, for example wavelengths in the visible range, including for example laser wavelengths.

Illustratively, the sensors 20 comprise diode detectors. The diode detectors may be micro-sized and may be tuned to detect a desired wavelength, for example a laser beam in the optical range. These small and light weight diode detectors or sensors 20 illustratively may provide total surveillance of the surrounding airspace. The system further comprises a diagnostic instrument 30, illustratively integrated with the sensors 20 and an information display and warning system (not shown). The diagnostic instrument may comprise a data processing control unit and a signal conditioner, which, illustratively, operate to identify and calculate attribution or the geographic location of a threat, for example a laser threat. The display and warning system may provide graphical and/or textual or other threat notice or warning of and location data on the threat system. The system may generate a threat signal or threat warning signal or notice.

The sensors or detectors 20, data processing or attribution control unit, signal conditioner, and display and threat warning system illustratively are integrated together with one another and the vehicle or person to be protected. The detectors may sense or detect a threat, such as an optical threat source. The system illustratively is low profile and minimizes impact to aerodynamic geometry of any vehicle integrated therewith. The system illustratively is low power and light weight. Signal processing components and algorithms compute and process any detected threat, generate a threat signal or warning cue, and disseminate or display the threat signal or warning notice providing information of the threat, for example a laser beam. Information including geographic location (geo location) data of the threat may be displayed. The system illustratively comprises high-speed detection circuitry for near-instantaneous detection, analysis, and display or dissemination of warning or alert cues. One or more, or a combination of possible protective measures may also be suggested or implemented by the system as noted herein.

It will be appreciated that the system 10 illustratively protects an optical device—for example a human eyeball, a camera lens, a forward looking infrared lens, or other receiver—from a threat including a laser beam operating in the visual spectrum.

Geolocation techniques may include analysis of, for example, any one or a combination of a beam's or wave's time of arrival, phase of arrival, angle of arrival at one sensor, with that at another sensor or sensors. Known locations of threats may also be used in the analysis. Also, the pilot or other user may input additional data including visual, aural or other sensory data into the system for analysis.

A detection system is disclosed, the detection system generally comprising: a sensor system, a processing control unit, a display; and a countermeasure system; wherein the sensor system, the processing control unit; the display and the countermeasure system are integrated with one another.

The sensor system may comprise a photonic detector. It may also comprise a plurality of photonic detectors.

Illustratively, any detector may comprise micro-sized detectors.

The photonic detector(s) may comprise detectors tuned to wavelengths of interest. For example, the detectors may be selectively tunable to wavelength(s) of interest.

The detectors may be designed to detect the polarization state of the threat.

Illustratively, the detection system may be optimized to detect laser wavelengths of interest.

The detection system may be operatively integrated into a vehicle in order to provide continuous surveillance and detection around the vehicle. Such a vehicle may for example comprise ab aircraft. The detection system may provide continuous and uninterrupted surveillance and detection capabilities in three dimensions about the vehicle.

The detection system may comprise components that have a minimal impact upon vehicle aerodynamic geometry.

Illustratively, the processing control unit comprises detection circuitry and a signal conditioner.

Illustratively, the control unit comprises a Graphical Processing Unit (GPU).

Illustratively, the control unit and the vehicle are integrated together.

The detection system illustratively generates a threat warning signal comprising a cue perceptible by any one or any combination of human senses.

The detection system may further comprise a countermeasure system. The countermeasure system may comprise a self-protection system.

Also disclosed is a detection system comprising: a sensor system, a processing control unit, and a display.

The sensor system illustratively comprises an optical sensor.

Further disclosed is a method of detecting a threat, the method comprising the steps of: providing a sensor system, providing a control unit, providing a display; sensing a threat; processing the threat; generating a threat warning signal; disseminating the threat warning signal as a warning cue; and wherein the sensor system, the control unit and the display are integrated with one another.

The method illustratively may further comprise the steps of displaying the warning cue as any one of or any combination of an aural, visual, tactile, and an olfactory cue; locating the geographic position of the threat; and actuating a countermeasure system.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A detection system comprising: a sensor system, a processing control unit, a display, and a countermeasure system, wherein the sensor system, the processing control unit, the display and the countermeasure system are integrated with one another, and the detection system is operatively integrated into an aircraft in order to provide continuous surveillance and detection capabilities in three dimensions about the aircraft,
    wherein the sensor system comprises a plurality of photonic detectors configured to detect a laser beam illuminating the aircraft and each of the detectors are selectively tunable to laser beam wavelength(s) of interest,
    wherein the processing control unit is configured to determine a geographic location of a source of the laser beam, and
    wherein the countermeasure system is configured to generate instructions to physically maneuver the aircraft to avoid the laser beam,
    wherein the plurality of photonic detectors includes a first photonic detector and a second photonic detector that is spaced apart from the first photonic detector and the processing control unit is configured to provide the geographic location of the source of the laser beam in the map coordinate system based on at least one of a wave's time of arrival, phase of arrival, and angle of arrival at the first photonic detector and the second photonic detector,
    wherein the processing control unit is configured to receive user input indicative of a known location of the source of the laser beam and determine the geographic location of the source of the laser beam in the map coordinate system based on the user input.

2. The detection system of claim 1 wherein the detectors are designed to detect the polarization state of the threat.

3. The detection system of claim 1 wherein the detection system is configured to detect laser wavelengths in the visible range.

4. The detection system of claim 3 wherein the detection system comprises components that have a minimal impact upon vehicle aerodynamic geometry and the plurality of photonic detectors comprises micro-sized detectors.

5. The detection system of claim 1 wherein the processing control unit comprises detection circuitry and a signal conditioner.

6. The detection system of claim 5 wherein the detection system generates a threat warning signal comprising a cue perceptible by any one or any combination of human senses.

7. A method of detecting a threat, the method comprising the steps of:
providing a sensor system configured to couple with an aircraft and to detect a laser threat, a control unit, and a display;
sensing a laser threat illuminating the aircraft with the sensor system;
processing the laser threat with the control unit;
generating a threat warning signal;
disseminating the threat warning signal as a warning cue; and
wherein the sensor system, the control unit, and the display are integrated with one another,
the method further comprising the steps of displaying the warning cue as one or more of an aural, visual, tactile, and an olfactory cue; locating a geographic position of the laser threat; and actuating a countermeasure system,
wherein actuating the countermeasure system includes generating instructions to physically maneuver a vehicle to avoid the laser threat based on the geographic position of the laser threat,
wherein the sensor system comprises a plurality of photonic detectors configured to sense the laser threat and each of the photonic detectors are selectively tunable to laser beam wavelength(s) of interest,
wherein the plurality of photonic detectors includes a first photonic detector and a second photonic detector that is spaced apart from the first photonic detector and the processing control unit is configured to provide the geographic position of the source of the laser beam in a map coordinate system based on at least one of a wave's time of arrival, phase of arrival, and angle of arrival at the first photonic detector and the second photonic detector,
wherein the processing control unit is configured to receive user input indicative of a known location of the source of the laser beam and determine the geographic position of the source of the laser beam in the map coordinate system based on the user input.

8. The detection system of claim 1 wherein the countermeasure system further includes at least one of chaff, flares, and a protective shield.

9. The detection system of claim 1 wherein the countermeasure system further includes an optical filter configured to deflect light having a wavelength in the visible range.

10. The detection system of claim 1 wherein the countermeasure system further includes an optical filter configured to alter a wavelength of light having a wavelength in the visible range.

11. The method of claim 7 wherein actuating the countermeasure system further includes at least one of deflecting the laser threat, altering a wavelength of the laser threat, deploying chaff, activating flares, activating protective shields, and activating an optical filter.

* * * * *